UNITED STATES PATENT OFFICE.

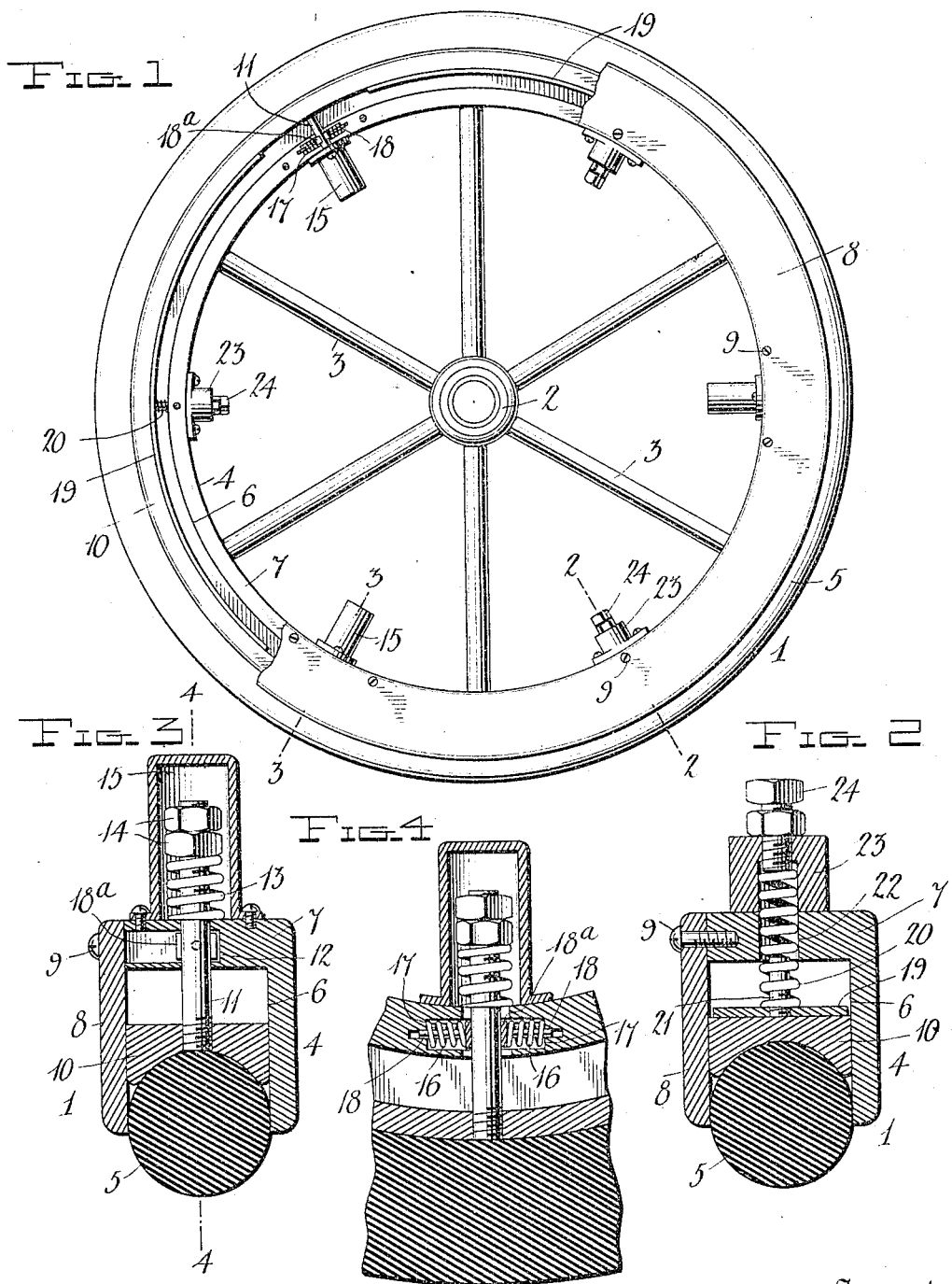

WILLIAM A. FIELD, OF CHICAGO, ILLINOIS.

TIRE.

No. 825,269.

Specification of Letters Patent.

Patented July 3, 1906.

Application filed October 16, 1905. Serial No. 282,962.

*To all whom it may concern:*

Be it known that I, WILLIAM A. FIELD, a citizen of the United States, residing at Chicago, in the county of Cook and State of Illinois, have invented certain new and useful Improvements in Tires; and I do declare the following to be a full, clear, and exact description of the invention, such as will enable others skilled in the art to which it appertains to make and use the same.

My invention relates to improvements in elastic tires for the wheels of automobiles and other vehicles.

The object of the invention is to provide a simple, inexpensive, and efficient means for elastically mounting tires of any description upon the rims or fellies of wheels.

With the above-mentioned and other objects in view the invention consists of certain novel features of construction, combination, and arrangement of parts, as will be hereinafter more fully described, and particularly pointed out in the appended claims.

In the accompanying drawings, Figure 1 is a side elevation of a wheel constructed in accordance with my invention, parts being broken away to more clearly illustrate the construction. Fig. 2 is a transverse sectional view taken on the line 2 2 of Fig. 1, Fig. 3 is a transverse section taken on the line 3 3 in Fig. 1, and Fig. 4 is a detail sectional view taken on the line 4 4 in Fig. 3.

Referring to the drawings by numerals, 1 denotes the wheel of an automobile or other vehicle, which consists of a hub 2, spokes 3 radiating therefrom, a felly 4, and a tire 5. The tire 5 may be of rubber, metal, or any other material and of any desired form and construction. The felly 4 has in its periphery a deep annular groove 6, and it is preferably formed in two sections, a main portion 7 and a removable ring or annular plate 8, which is secured upon one side by screws or similar fastening means 9. The tire 5, which is here shown in the form of a ring of solid rubber of circular form in cross-section, is disposed in the groove 6, which latter is formed by the body portion 7 and the ring 8 of the felly. Said tire is supported in the groove 6, so that it projects partially outside of the same, by an annular rim 10, of metal or other suitable material, which is arranged in the groove 6. This rim is adapted to slide transversely in the groove and is guided and supported by a series of studs or pins 11, which project inwardly through slots 12, formed in the felly, and have upon their inner ends coil-springs 13. The latter are confined between the felly and pairs of adjusting-nuts 14, which are provided upon the screw-threaded ends of the pins or studs 11, as clearly shown in Fig. 3 of the drawings. If desired, the springs and the ends of the pins may be inclosed in casings 15, secured upon the felly, as shown. The studs 11 are held centered in the slots 12 by means of pairs of coil-springs 16, which are disposed in recesses 17, formed in the felly upon opposite sides of said pins or studs. These coil-springs 16 surround pins 18, which slide in reduced portions of the recesses 17 and which have upon their adjacent ends grooved heads 18ª, which engage the pins or studs 11 at diametrically opposite points, the springs being confined between said heads and shoulders formed in the recesses 17, as clearly shown in the drawings. This construction permits the rim 10 to slide transversely and also swing longitudinally to a slight extent. The rim 10 is elastically supported by a series of segment-shaped blocks or plates 19, which have a curvature similar to the curvature of said groove. These blocks or plates are disposed between the bottom of the groove 6 and the inner face of the rim 10 and are elastically supported by one or more coil-springs 20. As shown in the drawings, but one of the springs 20 is provided for each block or plate, and it surrounds a pin or stud 21, which projects inwardly from said block or plate. Said coil-springs 20 project through apertures 22, formed in the felly, and into casings 23, which are secured upon the felly, as shown. In said casings are provided set-screws 24, which have their inner ends bearing against the coil-springs 20, so that the tension of the latter may be readily adjusted. Suitable jam-nuts may be provided upon said screws, as shown. Instead of employing a rubber tire, as shown in the drawings, I may make the rim or tire 10 sufficiently thick to cause its outer surface or periphery to project beyond the outer edges of the groove 6.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a wheel, the combination with a felly having in its periphery an annular groove, of a tire in the outer portion of said groove, a loosely-mounted rim within said groove for supporting said tire, a series of segmental plates or blocks within said groove and beneath said rim, springs for elastically supporting said segmental blocks, radially-disposed studs projecting inwardly from the inner face of said rim and through openings in said felly, coil-springs upon the free ends of said studs, and adjusting devices upon said studs.

2. In a wheel, the combination with a felly having in its periphery an annular groove, of a tire in the outer portion of said groove, a loosely-mounted rim within said groove for supporting said tire, a series of segmental plates or blocks within said groove and beneath said rim, springs for elastically supporting said segmental blocks, means for varying the tension of said springs, radially-disposed studs projecting inwardly from the inner face of said rim and through slots in said felly, nuts upon the threaded ends of said studs, coil-springs upon said studs between said nuts and said felly, and means for centering said studs in said slots and holding them in a radial position.

3. In a wheel, the combination with a felly having in its periphery an annular groove, of a tire in the outer portion of said groove, a loosely-mounted rim within said groove for supporting said tire, a series of segmental plates or blocks within said grooves and beneath said rim, springs for elastically supporting said segmental blocks, means for varying the tension of said springs, radially-disposed studs projecting inwardly from the inner face of said rim and through slots in said felly, nuts upon the threaded ends of said studs, coil-springs upon said studs between said nuts and said felly, pins slidable in recesses in said felly and disposed upon opposite sides of said studs, heads upon said pins and engaged with said studs, and coil-springs surrounding said pins and confined between their heads and shoulders in said recesses, substantially as described.

4. In a wheel, the combination with a felly having in its periphery an annular groove and a series of radially-disposed slots, of a tire in the outer portion of said groove, a rim in said groove for supporting said tire, a series of studs projecting inwardly from the inner face of said rim and through the slots in said felly, adjusting-nuts upon the threaded ends of said studs, coil-springs upon said studs between said nuts and said felly, and coil-springs adjusted upon opposite sides of said studs for centering the latter in their slots and maintaining them in radial position, substantially as described.

In testimony whereof I have hereunto set my hand in presence of two subscribing witnesses.

WILLIAM A. FIELD.

Witnesses:
JOHN F. MCCAFFREY,
THOMAS J. HARAN.